United States Patent Office 2,954,966
Patented Oct. 4, 1960

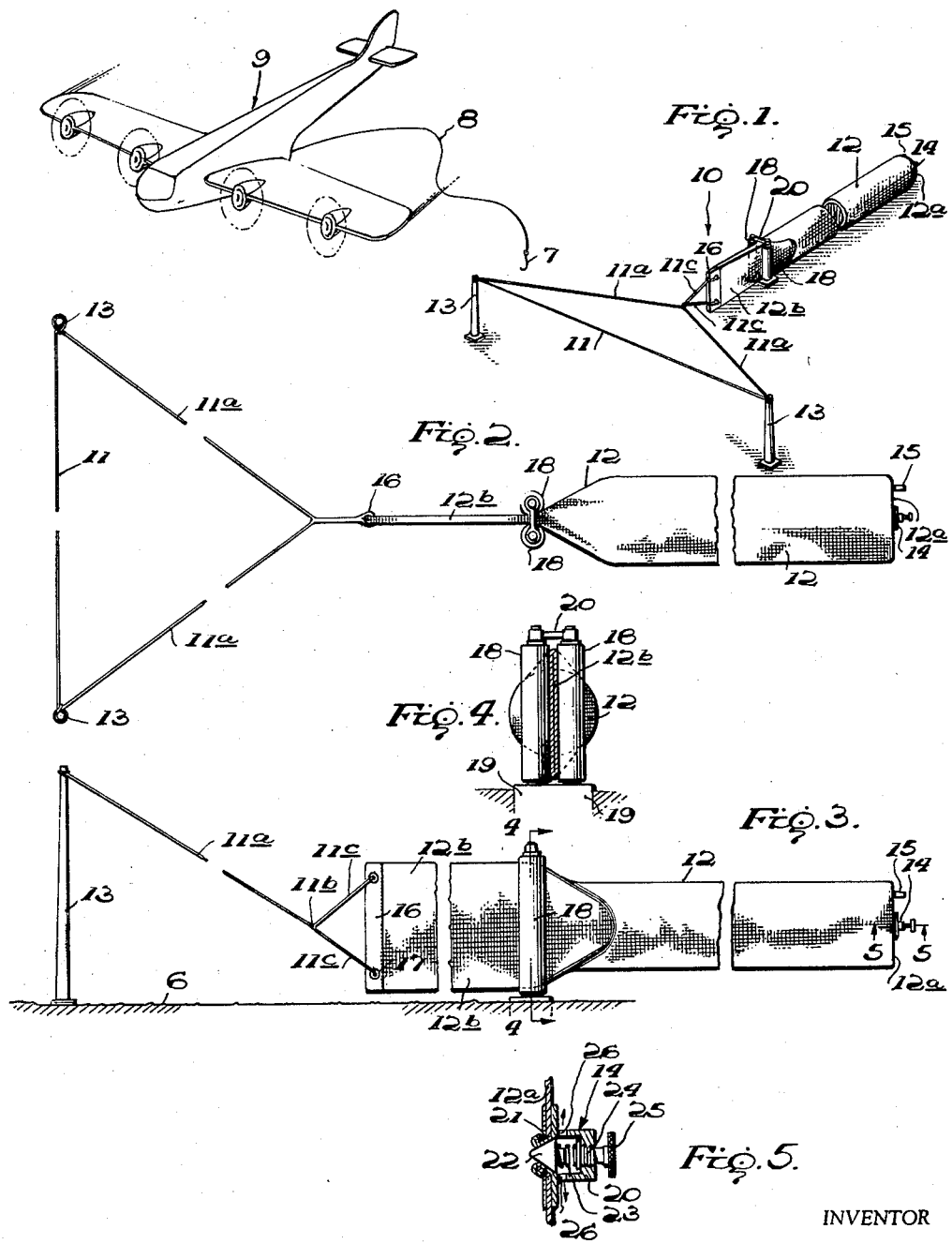

2,954,966

PNEUMATIC DECELERATOR FOR IN-FLIGHT AIRCRAFT UNLOADING

Walton W. Cushman, Webb City, Mo.
(6428 Lumar Drive SE., Washington 22, D.C.)

Filed July 10, 1959, Ser. No. 826,381

7 Claims. (Cl. 258—1.2)

(Granted under Title 35, U.S. Code (1952), sec. 266)

The invention described herein, if patented, may be manufactured and used by and for the Government for governmental purposes, without the payment to me of any royalty thereon.

The present invention relates to a pneumatic decelerator for in-flight aircraft unloading. It has to do particularly, although not exclusively, with improved pneumatic means or mechanism for checking, slowing down, or reducing the speed of travel or movement of an airborne load of material, or the like, withdrawn from an in-flight aircraft as it makes a low pass over said means or mechanism, to thus lessen the force of the impact of the load with the ground surface and shorten its travel distance after touching said ground surface.

One of the important objects of the present invention is to provide pneumatic decelerating means as aforesaid, capable of being set up on the ground surface at any desired location, for the purpose of extracting an airborne load from an in-flight aircraft and automatically check its fall, reduce its force of impact with the ground, and reduce its travel distance after ground contact.

Another object of the invention is to provide pneumatic decelerating means which is manually adjustable to vary the amount of pull, drag, or resistance on the moving load in accordance with, and in proportion to, the size and/or weight of said load; a further object being to provide relatively simple and thus inexpensive means for the intended purpose.

The foregoing and other objects and advantages of the present invention will appear from the following description and appended claims when considered in conjunction with the accompanying drawing forming a part of this specification, wherein like reference characters designate similar parts in the several views.

Fig. 1 is a perspective view of one embodiment of the present invention, with an aircraft making a low pass thereover and about to have a load extracted or snatched therefrom;

Fig. 2 is a top plan view of the pneumatic decelerating means of Fig. 1, partly broken away;

Fig. 3 is a side elevational view thereof, partly broken away;

Fig. 4 is a vertical section taken substantially along the line 4—4 of Fig. 3, looking in the direction of the arrows; and Fig. 5 is an enlarged scale horizontal section through the bleeder valve assembly, taken substantially along the line 5—5 of Fig. 3, looking in the direction of the arrows.

Before explaining in detail the present invention, it is to be understood that the invention is not limited in its application to the details of construction and arrangement of parts illustrated in the accompanying drawing, since the invention is capable of other embodiments and of being practiced or carried out in various ways. It is to be understood also that the phraseology or terminology employed herein is for the purpose of description and not of limitation, and it is not intended to limit the invention claimed herein beyond the requirements of the prior art.

Referring now to the drawing and particularly to Figure 1 thereof, one embodiment of my present invention is shown in ground-supported position, with an in-flight aircraft having an airborne load about to make a low pass over the decelerating means to permit said load to be extracted therefrom, the decelerating means, or load-receiving mechanism, being indicated as a whole at 10 and with the aircraft being identified by the reference numeral 9. The aircraft carries a load of materiel (not shown) to which is attached a cable or line 8 having at its outer end a hook 7.

The hook 7 is about to engage a pole-supported cable or line 11 having converging and downwardly extending portions 11a, 11a which are crossed at 11b and whose terminal end portions 11c, 11c are attached to the adjacent or forward end of a pneumatic tube-like decelerator 12.

The cable 11, 11a, 11b, 11c is stretched around the upper end portions of a pair of spaced upright ground-supported masts, poles, or posts 13 so that the forward portion or length of cable 11, between the posts, extends in substantially a horizontal plane some four, five, or six feet, or more, above the ground surface 6 and at substantially a right angle to the direction of flight of the approaching aircraft 9, thus providing a target or catcher for, and directly in the path of, the hook 7 dangling in the air at the end of the load-attached line or cable 8.

The pneumatic portion 12 of the decelerator means or apparatus will now be described. The pneumatic tube 12 is of substantial length and of the desired diameter for the purpose and is preferably formed from a suitable elastomer, or the like flexible material. The rear or so-called free end 12a of the tube 12 is closed except for an inset bleeder valve assembly 14 and a conventional inflating valve 15, see particularly Figs. 2, 3 and 5. The opposite, or forward end 12b of tube 12 is provided with a closure clamp 16 having spaced holes or openings 17 formed therein to receive the ends 11c, 11c of cable 11, see Figs. 1 and 3.

To assemble the deceleration equipment, the poles or masts 13, 13 are set up on the ground 6 in any suitable manner. At a central point spaced from and midway between the posts 13, 13 a pair of parallel upright rotatable pressure rollers 18, 18 are mounted for rotation upon one, or a pair of base members 19, 19, which provide rigid supports for the upright rollers. To support and maintain the parallel rollers 18, 18 in spaced relation at their upper ends, there is provided a connecting rod or link 20 which is attached at its opposite ends to the upper ends of the shafts or axles of rollers 18, 18. The tube 12, in partially deflated condition, is flattened at its forward or lead end 12b, see Figs. 1 through 4, and fed through the space between the pressure rollers 18, 18. The free ends 11c, 11c of cable 11 are passed through openings 17, 17 in clamp-closure 16 and secured. The tube 12 is now inflated through conventional air valve 15 to the desired pressure which may be determined by the use of a pressure gage (not shown), the inflated portion of the tube 12 being behind the pressure rollers 18, 18 at the right in Figs. 1, 2 and 3.

The air bleeder valve assembly 14 (see Fig. 5) is mounted in end wall 12a and comprises a casing 20, a conical seat 21, a conical valve and stem 22, urged to its seat by a spring 23, and a spring pressure-adjusting member 24 having a knurled finger piece 25 outside the casing 20. By varying the pressure exerted by spring 23 on valve 22, the pressure of the air within tube 12 required to unseat valve 22 to allow air to escape or bleed through ports 26, 26 can be varied.

For example, if an extra heavy load from aircraft 8 is being discharged, the pressure of spring 23 will be adjusted to a high rate so that it will require more air pressure from within tube 12 to unseat valve 22 and allow bleeding of air through ports 26, 26, than if the spring 23 were adjusted for the landing of a load of lighter weight. In other words, the heavier the load being snatched from the aircraft, the slower the rate of bleeding of air from the tube 12, thus slowing down the rate of pull on tube 12 between pressure rollers 18, 18 by the load through the medium of its attached cable 8, hook 7 and the above-ground-supported cable or line 11, 11a, 11b and 11c.

Conversely, if a relatively light load of material is to be discharged, the pressure on bleeder valve 22 is adjusted so that a lesser pull on tube 12 is required to discharge or bleed a greater amount of confined air past valve 22 and through discharge ports 26, 26.

Ordinarily, the ground crew at the site or location of the decelerator 10 will be apprised of the character, size and approximate weight of the load of materiel, or the like, to be snatched from the aircraft. Therefore, it is a simple matter to adjust member 24, 25 of the bleeder valve assembly 14 to the proper pressure setting to accommodate the particular load to be discharged and decelerated.

By virtue of the nature, simplicity and construction of the pneumatic decelerator, the same can be assembled and set up for use in short order. Likewise, it can be easily and quickly dismantled and stored in an aircraft, truck, or other vehicle for transportation to another area or location.

In the use of the device, the cable 11 may be merely passed around the top end portions of posts 13, 13 and not attached thereto, so as to be free to be pulled loose upon contact being made by the load hook 7. If desirable, however, the cable 11 may be looped around or attached to the posts 13, 13, especially where it is planned to use the posts for only one load-discharge operation.

I claim:

1. A pneumatic decelerator for inflight aircraft unloading, comprising load-receiving mechanism including a pair of spaced relatively rigid masts, a length of cable loosely engaging the upper end portions of the masts and having its free ends extending away from the masts in converging relationship to provide a generally triangular cable arrangement, a pair of closely spaced upright pressure rollers supported on the ground surface adjacent the cable ends, an air-inflated decelerating tube connected at its forward end to the cable ends and having a normally closed spring-seated air bleeding valve assembly in its opposite end, the forward end portion of the tube being disposed between the pressure rollers, whereby upon engagement of an airborne load with the cable the tube is pulled forwardly through the rollers with the air pressure in the tube unseating the valve to relieve some of the pressure while resisting the forward movement of said tube and placing a drag on said load to decelerate its speed of movement materially and cushion the shock of the landing of the load, and means for adjusting the pressure of the air bleeding valve against its seat so as to vary the rate of discharge of air from the decelerating tube in proportion to the weight of the airborne load to be handled by the load-receiving mechanism.

2. Mechanism for unloading at a low elevation above the ground material from an aircraft in flight, comprising a pair of spaced uprights, a cable extending between the upper ends of the spaced uprights, the ends of said cable being extended outwardly from the uprights in converging relationship, air-inflated decelerating means mounted on the ground to one end of which the cable ends are attached, said means comprising an elongated flexible tube having a normally closed spring-seated air bleeding valve assembly in its opposite end, a pair of closely spaced rollers between which the tube extends, and by which the tube is compressed as it is moved between the rollers, said rollers compressing the tube as it is pulled between them by the unloaded material to unseat the valve and relieve the air pressure while at the same time acting to retard its movement and reduce the force of its impact with the ground, and means for adjusting the pressure of the air bleeding valve against its seat so as to vary the rate of discharge of air from the decelerating tube in accordance with the weight of the airborne load to be handled by the load-receiving mechanism.

3. Mechanism for unloading material from an aircraft in flight at a low elevation above the ground, comprising spaced upright supports removably supporting a cable therebetween at a point above the ground surface, the ends of asid cable converging toward each other to provide a generally triangular cable arrangement, a pair of closely spaced upright pressure rollers supported on the ground adjacent the cable ends an air-inflated decelerating tube attached to the cable ends and having a normally closed spring-seated air-bleeder valve assembly in its opposite end, said tube extending between and in contact with said pressure rollers, and means for adjusting the pressure of the air-bleeder valve against its seat so as to vary the rate of discharge of air from the decelerating tube in proportion to the weight of the airborne load to be handled by the load-receiving mechanism.

4. Means for retarding the speed of travel of a load withdrawn from an in-flight aircraft, comprising load-receiving mechanism including a post-supported cable in generally triangular arrangement, a flexible inflated tube-like ground-supported member attached to the free ends of the cable for resisting movement of said cable when contacted by the load withdrawn from the aircraft, combined guide and compression applying means mounted on the ground through which said flexible member is drawn by the load to slow down the movement of said load and lessen the impact thereof with the ground surface, and means disposed at the trailing end of said flexible tube-like member for normally maintaining said tube inflated but permitting gradual deflection thereof as the load pulls it through said combined guide and compression applying means.

5. Means for retarding the speed of travel of a load withdrawn from an in-flight aircraft, comprising an above-ground-supported cable adapted to be engaged by a hook-like member depending from an airborne load, an air-inflated member disposed on the ground surface and connected to said cable and having air-bleeding means, said member resisting the pull of the cable when the latter is contacted by the withdrawn airborne load, and means mounted on the ground through which said air-inflated member is drawn by the load to reduce the speed of travel of said load and lessen the force of impact thereof with the ground surface, said air-bleeding means being normally closed but being openable by the ground-mounted means when the air-inflated member is pulled therethrough by said load and cable.

6. Retarding means according to claim 5, wherein the air-bleeding means is a normally closed adjustable valve assembly for controlling the rate of air discharge from the inflated member to thus control the amount of retardation to which the load is subjected.

7. Retarding means according to claim 5, wherein the air-inflated member is provided with an air-inflating valve in addition to its air-bleeding means.

References Cited in the file of this patent

UNITED STATES PATENTS

| | | |
|---|---|---|
| 1,439,927 | Uppercu | Dec. 26, 1922 |
| 2,401,248 | Ingres | May 28, 1946 |
| 2,916,764 | Gerber | Dec. 15, 1959 |

UNITED STATES PATENT OFFICE

CERTIFICATE OF CORRECTION

Patent No. 2,954,966　　　　　　　　　　　October 4, 1960

Walton W. Cushman

It is hereby certified that error appears in the printed specification of the above numbered patent requiring correction and that the said Letters Patent should read as corrected below.

Column 4, line 15, for "asid" read -- said --; line 18, after "ends" insert a comma; same column 4, line 41, for "deflection" read -- deflation --.

Signed and sealed this 11th day of April 1961.

(SEAL)
Attest:
ERNEST W. SWIDER
Attesting Officer

ARTHUR W. CROCKER
Acting Commissioner of Patents